United States Patent
Takahashi et al.

(10) Patent No.: US 6,767,610 B2
(45) Date of Patent: Jul. 27, 2004

(54) MAGNETIC TAPE HAVING SPECIFIC SURFACE RECORDING DENSITY AND COMPRISING A SUPPORT HAVING SPECIFIC SURFACE ROUGHNESS

(75) Inventors: Masatoshi Takahashi, Kanagawa (JP); Minoru Sueki, Kanagawa (JP); Toshiyuki Kitahara, Kanagawa (JP)

(73) Assignee: Fuji Photo Film Co., Inc., Kanagawa (JP)

( * ) Notice: Subject to any disclaimer, the term of this patent is extended or adjusted under 35 U.S.C. 154(b) by 0 days.

(21) Appl. No.: 10/020,284

(22) Filed: Dec. 14, 2001

(65) Prior Publication Data

US 2002/0119344 A1 Aug. 29, 2002

(30) Foreign Application Priority Data

Dec. 15, 2000 (JP) ........................................ 2000-382314

(51) Int. Cl.$^7$ ................................................. G11B 5/66
(52) U.S. Cl. ................................ 428/141; 428/694 BB; 428/694 BR; 428/900
(58) Field of Search ...................... 428/694 B, 694 BB, 428/694 BR, 141, 900

(56) References Cited

U.S. PATENT DOCUMENTS 6,228,461 B1 * 5/2001 Sueki et al. ................... 428/98
6,432,503 B2 * 8/2002 Aonuma et al. .............. 428/65.3
6,444,290 B1 * 9/2002 Takahashi et al. ........... 428/141
6,703,107 B2 * 3/2004 Takahashi et al. ........... 428/141

FOREIGN PATENT DOCUMENTS

| JP | 03-91548 A | * | 4/1991 |
| JP | 8-225517 A | | 9/1996 |
| JP | 11-250449 A | | 9/1999 |
| JP | 02-212393 A | * | 4/2002 |

* cited by examiner

Primary Examiner—H. Thi Le
(74) Attorney, Agent, or Firm—Stroock & Stroock & Lavan LLP

(57) ABSTRACT

A magnetic tape includes: a back coating layer containing a carbon black; a support; a non-magnetic layer containing a non-magnetic powder and a binder, which is substantially non-magnetic; and a magnetic layer containing a ferromagnetic powder and a binder, in this order, wherein the magnetic tape is a magnetic tape for recording a signal with a 10 to 100 Mbit/cm$^2$ surface recording density; the magnetic tape has a temperature expansion coefficient in a width direction thereof of a 0.0015%/° C. or less, a humidity expansion coefficient of 0.0015%/% RH or less, an offset yield strength in a longitudinal direction thereof of 10N or more, a rupture strength of 30 N or more; and the support has a center plane average roughness on a coating surface side of the magnetic layer of 1.0 nm or less, a center plane average roughness on a coating surface side of the back coating layer of 3.0 to 9.0 nm, and projections having a 273 nm or more height existing on the coating surface side of the magnetic layer of 10 pieces/100 cm$^2$ or less.

12 Claims, No Drawings

MAGNETIC TAPE HAVING SPECIFIC SURFACE RECORDING DENSITY AND COMPRISING A SUPPORT HAVING SPECIFIC SURFACE ROUGHNESS

BACKGROUND OF THE INVENTION

1. Field of the Invention

The present invention relates to a magnetic tape to be used advantageously particularly for recording computer data. More specifically, it relates to a magnetic tape to be used advantageously particularly in a magnetic recording and reproduction system using an MR head (MR head for recording a signal with a 10 to 100 Mbit/cm$^2$ surface recording density).

2. Description of the Related Art

Recently, a system with a thin film magnetic head assembled has been used practically in a magnetic recording and reproduction system for recording and reproducing computer data. Since the thin film magnetic head can be processed easily for miniaturization or into a multi track head, a multi track fixed head of a thin film magnetic head has been used frequently particularly in a system using a magnetic tape as the recording medium. By use of the thin film magnetic head, improvement of the track density and improvement of the recording efficiency can be achieved owing to the miniaturization so as to realize high density recording as well as improvement of the data transfer rate can be enabled owing to achievement of the multi track. The thin film magnetic head can be classified to an induction type head responding to the time change of a magnetic flux, and a magnetic resistance type head (MR head) utilizing the magnetic resistance effect responding to the size of a magnetic flux on the whole. Since the induction type head has a small head coil winding number due to the flat structure, it involves the problem of difficulty in enlarging the magnetomotive force so that a sufficient reproduced output cannot be obtained. Therefore, an MR head capable of easily obtaining a high reproduced output is used for the reproduction, and in contrast, an induced type head is used for the recording. These recording and reproduction heads are assembled in a system ordinarily as an integrated type (composite type). In the above-mentioned magnetic recording system, a linear recording method capable of realizing a higher data transfer is adopted.

As a magnetic tape for recording computer data used for a magnetic recording and reproduction system with the MR head assembled, for example, magnetic tapes corresponding to the 3480 type, the 3490 type, the 3590 type, and the 3570 type of the IBM standard are known. These magnetic tapes have a basic structure comprising a relatively thick magnetic layer including a ferromagnetic powder and a binder, with a 2.0 to 3.0 μm thickness in a single layer structure provided on a support. These magnetic tapes comprising a single layer structure magnetic layer involves a problem in that it cannot sufficiently satisfy the recent need as a medium for storing a large number of data.

In order to deal with the problem, as a magnetic recording medium used in a magnetic recording system with a thin film magnetic head assembled, for example, JP-A-8-227517 discloses a magnetic recording medium (magnetic tape) comprising a lower non-magnetic layer with an inorganic non-magnetic powder dispersed in a binder provided on a non-magnetic support, and a thin upper magnetic-layer with a ferromagnetic metal powder dispersed in a binder provided on the non-magnetic layer. Since the output decline due to the thickness loss can be restrained as well as a high recording density can be achieved by making the upper magnetic layer thinner (0.3 μm), storage of data can be enabled with a larger capacity compared with a magnetic tape comprising a single layer structure magnetic layer. Moreover, JP-A-11-250449 similarly discloses a magnetic tape comprising a magnetic layer on a non-magnetic layer.

In a magnetic recording and reproduction system adopting a linear recording method, the track width for recording and reproduction in a magnetic tape tends to be narrower in order to realize a larger recording capacity with a higher recording density. At the time or recording and reproduction, the magnetic head moves in the magnetic tape width direction (vertical direction) and either track should be selected. With a narrower track with, a higher accuracy is required for controlling the relative position of the magnetic tape and the head.

The conventional linear recording method is designed such that the magnetic tape running position is fixed by a guide or the like so that the head can be moved in the vertical direction at a predetermined position. However, with a narrower track width, since the reproduction head runs off the optimum position with the data recorded in the case the tape is stretched due to the influence by change of the environment, such as the temperature and the humidity, or the tape running position is displaced from the anticipated running position, the output can easily be lowered. Therefore, recently, a method of recording a servo signal in the longitudinal direction of a magnetic head, detecting the relative position of a head with respect to the tape by the servo signal, and controlling the head position so that the head can run at the optimum position of a track, is utilized. The servo signal includes a plurality of servo bands, and has a signal changeable in the width direction in each servo band. Therefore, by reproducing the servo signal, the position of the reproduction head can be detected with respect to the servo band. In a system utilizing a magnetic tape with such a servo signal recorded, it is preferable that the interval between the servo bands in the width direction, and the servo band width are not changeable. That is, it is preferable that the size in the width direction of the magnetic tape is not changeable.

In contrast, since the magnetic tape for the above-mentioned system is used by high speed running and repeated running, unchangeability of the size in the longitudinal direction thereof is required increasingly than before because the tensile force of the magnetic tape tends to be larger in the system in order to ensure the contact of the magnetic tape with respect to the MR head (contact state with respect to the MR head) in a system using an MR head capable of high density recording. In particular, the tensile force is increased at the time of stoppage or running in the BOT part (the starting end part of the tape wound around on a tape reel) and the EOT part (the finishing end part of the tape wound around on the tape reel) of the magnetic tape. As a result, the magnetic tape can be stretched so as to cause the output decline, or thereby, the size of the magnetic tape in the width direction is influenced particularly in the magnetic tape with the servo signal recorded as mentioned above so that the track control is disturbed so as to easily generate an error. Therefore, in the magnetic tape for the above-mentioned system, a dynamical strength higher than the conventional one is desired in the longitudinal direction thereof.

Moreover, a higher magnetic tape output is preferable in order to achieve high density recording.

According to the discussion of the present inventors, it was found that further improvement is required in terms of the tracking characteristic and the other tape running characteristics for utilizing the magnetic tape disclosed in JP-A-8-227517 for the above-mentioned system. That is, it was found out that the magnetic tape has a relatively large change in the width direction with respect to the temperature or humidity change, and thus in the case of recording or reproduction using the tape, the tracking accuracy is deteriorated so that a sufficient reproduction output can hardly be obtained even in the case the track control is executed by the servo signal, or an error can easily be generated after repeated running.

Furthermore, according to the magnetic tape disclosed in JP-A-11-250449, a sufficient high output reproduction cannot be obtained in the case of high density recording, and thus improvement has been called for.

SUMMARY OF THE INVENTION

An object of the invention is to provide a magnetic tape having a high recording density suitable for a magnetic recording and reproduction system utilizing a linear recording method, with an MR head assembled. In particular, it is to provide a magnetic tape having a high recording density and the excellent durability, with little change of the size of the magnetic tape width direction, capable of recording and reproducing repeatedly with a high output and a high reliability by reducing the track displacement (off track) at the time of running even in the case of a track with a narrow width.

By the further study of the inventor, it was found out that the stable tracking characteristic can be obtained with little off track at the time of running even in the case of a narrow width track by restraining the temperature and humidity expansion coefficients in the width direction of the magnetic tape, and reinforcing the dynamical strength in the tape longitudinal direction so as to reduce the size change particularly in the tape width direction in a magnetic tape for recording a signal with a 10 to 100 Mbit/cm$^2$ surface recording density. Moreover, a magnetic tape with the excellent durability, capable of obtaining a sufficient recording and reproduction characteristic can be provided even in the case of recording a signal of a 10 to 100 Mbit/cm$^2$ surface recording density by having a 1.0 nm or less center plane average roughness (SRa) of the support on the magnetic layer coating surface side, a 3.0 to 9.0 nm center plane average roughness (SRa) of the support on the opposite surface, and 10 pieces/100 cm$^2$ or less projections of a 273 nm or more height existing on the magnetic layer coating a surface side.

The invention provides a magnetic tape comprising a non-magnetic layer containing a non-magnetic powder and a binder, which is substantially non-magnetic, and a magnetic layer containing a ferromagnetic powder and a binder on one surface of a support in this order, and a back coating layer containing a carbon black on the other surface of the support, wherein the magnetic tape is a magnetic tape for recording a signal with a 10 to 100 Mbit/cm$^2$ surface recording density, having a 0.0015%/° C. or less temperature expansion coefficient in the width direction of the magnetic tape, a 0.0015%/% RH or less humidity expansion coefficient, a 10 N or more offset yield strength in the longitudinal direction of the magnetic tape, a 30N or more rupture strength, a 1.0 nm or less center plane average roughness of the support on the magnetic layer coating surface side, a 3.0 to 9.0 nm center plane average roughness of the support on the opposite surface, and 10 pieces/100 cm$^2$ or less projections of a 273 nm or more height existing on the magnetic layer coating surface side of the support.

A magnetic tape of the invention preferably has the following embodiments.
(1) The support is made of a polyethylene naphthalate.
(2) The center plane average roughness of the support on the magnetic layer coating surface side is 1.0 nm or less.
(3) The center plane average roughness of the support on the back coating layer coating surface side is 9.0 nm or less (further preferably 5 nm or less).
(4) Projections of a 273 nm or more height exist on the magnetic layer coating surface side of the support by 10 pieces/100 cm$^2$ or less (further preferably 5 pieces/100 cm$^2$ or less).
(5) The magnetic tape width is in the range of 5 to 13 mm (further preferably 7 to 13 mm, particularly preferably 10 to 13 mm).
(6) The magnetic tape entire thickness is in the range of 5 to 10 $\mu$m (further preferably 7 to 9.5 $\mu$m, particularly preferably 7.5 to 9.5 $\mu$m).
(7) A servo signal is recorded along the magnetic tape longitudinal direction for controlling the relative position of the recording and reproduction heads with respect to the magnetic tape in the width direction.
(8) The above-mentioned magnetic tape is for a magnetic recording and reproduction system using an MR head.
(9) The above-mentioned magnetic tape is for recording computer data.

DETAILED DESCRIPTION OF THE INVENTION

The magnetic tape of the invention comprises a non-magnetic layer containing a non-magnetic powder and a binder, which is to substantially non-magnetic, and a magnetic layer containing a ferromagnetic powder and a binder on one surface of a support in this order, and a back coating layer containing a carbon black on the other surface of the support for recording a signal with a 10 to 100 Mbit/cm$^2$ surface recording density. In the invention, a 0.0015%/° C. or less temperature expansion coefficient in the width direction of the magnetic tape, a 0.0015%/% RH or less humidity expansion coefficient, a 10N or more offset yield strength in the longitudinal direction of the magnetic tape, a 30 N or more rupture strength, a 1.0 nm or less center plane average roughness of the support on the magnetic layer coating surface side, a 3.0 to 9.0 nm center plane average roughness of the support on the opposite surface, and 10 pieces/100 cm$^2$ or less projections of a 273 nm or more height existing on the magnetic layer coating surface side of the support are provided.

A magnetic tape according to the invention preferably has a 0.0010%/° C. or less temperature expansion coefficient in the width direction thereof (further preferably 0.0008%/° C. or less). Moreover, the humidity expansion coefficient in the width direction of the magnetic tape is preferably 0.0013%/° C. or less (further preferably 0.0010%/° C. or less). The offset yield strength in the longitudinal direction of the magnetic tape is preferably 11N or more (further preferably 15N or more and 20N or less). Furthermore, the rupture strength in the longitudinal direction of the magnetic tape is preferably 30N or more (further preferably 31N or more and 35N or less).

First, a method for preparing the magnetic tape according to the invention having the above-mentioned characteristic as the principal elements of the invention will be explained. The method for preparing a magnetic tape according to the invention is not particularly limited. In the invention, it is preferable to use a material obtained by adjusting the dynamical strength in the width direction and/or the longitudinal direction of a material used for the support. Specifically, as the support material of the magnetic tape, a synthetic resin can be used preferably as described later, and it is preferable to use a material with the dynamical strength reinforced by a method of appropriately drawing in the width direction and/or the longitudinal direction at the time of forming (film formation) the synthetic resin in a film-like shape. The Young's modulus in the lateral direction of a support used in the invention is preferably 600 kg/mm$^2$ (5,880 MPa) or more (further preferably 630kg/mm$^2$ (6,174 MPa) or more, particularly preferably 650 kg/mm$^2$ (6,370 MPa) or more and 700 kg/mm$^2$ (6,860 MPa) or less). Moreover, the Young's modulus in the longitudinal direction thereof is preferably 750 kg/mm$^2$ (7,350 MPa) or more (further preferably 800 kg/mm$^2$ (7,840 MPa) or more and 850 kg/mm$^2$ (8,330 MPa) or less).

It is preferable that a support used for a magnetic tape of the invention is made of a synthetic resin film having the above-mentioned characteristics. The material can be selected from the material conventionally used for the magnetic tapes. Non-magnetic materials are particularly preferable. As examples thereof, synthetic resin films of polyesters (such as a polyethylene terephthalate, a polyethylene naphthalate, a mixture of a polyethylene terephthalate and a polyethylene naphthalate, and a copolymer containing an ethylene terephthalate component and an ethylene naphthalate component), polyolefins (such as a polypropylene), cellulose derivatives (such as a cellulose diacetate, and a cellulose triacetate), polycarbonates, polyamides (such as an aromatic polyamide, and an aramide), polyimides (such as a total aromatic polyimide), or the like, can be presented. Among these examples, the polyethylenenaphthalate (PEN) isparticularlypreferable. The thickness of the support is not particularly limited, but it is preferably in a range of 2.0 to 7.5 μm (further preferably 3.0 to 7.0 μm, particularly preferably 4.5 to 6.5 μm).

As mentioned above, according to a magnetic tape of the invention prepared by using a support with the dynamical strength in the width direction and/or the longitudinal direction thereof appropriately adjusted, it is preferable that the Young's modulus in the lateral direction is 650 kg/mm$^2$ (6,370 MPa) or more (further preferably 700 kg/mm$^2$ (6,869 MPa) or more, particularly preferably 730 kg/mm$^2$ (7,154 MPa) or more and 800 kg/mm$^2$ (7,840 MPa) or less). Moreover, it is preferable that the Young's modulus in the longitudinal direction is 950 kg/mm$^2$ (9,310 MPa) or more (further preferably 980 kg/mm$^2$ (9,604 MPa) or more, particularly preferably 1,000 kg/mm$^2$ (9,800 MPa) or more and 1,100 kg/mm$^2$ (10,780 MPa) or less).

Moreover, since the surface roughness (Ra) of the support surface influences the surface roughness of the magnetic layer and the back coating layer, it is preferable that the SRa (center plane average roughness) of the support surface is 1.0 nm or less on the magnetic layer coating surface side by measurement by the light interference method (TOPO3D produced by WYKO Co.). It is preferably 3.0 to 9.0 nm on the back coating layer coating surface side opposite thereto, and it is further preferably 3.0 to 5.0 nm. Furthermore, it is preferable that 10 pieces/100 cm2 or less, and further preferably 5 pieces/100 cm$^2$ or less projections of a 273 nm or more height exist on the magnetic layer coating surface side.

Next, the other configuration elements of the magnetic tape according to the invention will be explained. The magnetic layer will be described in detail. The magnetic layer is made of a ferromagnetic powder and a binder. Moreover, in general, a conductive powder (such as a carbon black), a polishing agent, and a lubricating agent are contained in the magnetic layer.

As the ferromagnetic powder, for example, ferromagnetic alloy powders (ferromagnetic metal powders) containing a magnetic iron oxide $FeO_x$ (x=1.33 to 1.5), a Co modified $FeO_x$ (x=1.33 to 1.5), an Fe, an Ni or a Co as the main component (75% or more), and known ferromagnetic powders such as a plate-like (tabular) hexagonal ferrite powder can be used. In particular, it is preferable to use a ferromagnetic alloy powder. In addition to the predetermined atoms, the ferromagnetic powders may also include at least one selected from the group consisting of an Al, an Si, an S, an Sc, a Ti, a V, a Cr, a Cu, a Y, an Mo, an Rh, a Pd, an Ag, an Sn, an Sb, a Te, a Ba, a Ta, a W, an Re, an Au, an Hg, a Pb, a Bi, an La, a Ce, a Pr, an Nd, a P, a Co, an Mn, a Zn, an Ni, an Sr and a B.

The ferromagnetic powder may be pretreated with a dispersing agent, a lubricating agent, a surfactant, an antistatic agent, or the like, before dispersion. Specifically, the treatment methods disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, U.S. Pat. Nos. 3,026,215, 3,031,341, 3,100, 194, 3,242,005, and 3,389,014 can be used. The ferromagnetic alloy powder may include a small amount of a peroxide or an oxide.

The above-mentioned ferromagnetic alloy powder preferably has a 30 to 70 m$^2$/g specific surface area of the particles thereof, and a 5 to 30 nm crystal size measured by the X ray diffraction method. In the case the specific surface area is too small, high density recording cannot be carried out sufficiently. In contrast, in the case it is too large, dispersion cannot be executed sufficiently so that a magnetic layer with a flat and smooth surface cannot be formed, and thus similarly high density recording cannot be carried out sufficiently.

The ferromagnetic alloy powder contains at least an Fe. Specifically, it is a metal alloy containing an Fe—Co, an Fe—Ni, an Fe—Zn—Ni or an Fe—Ni—Co as the main component. The Fe may be used alone. Moreover, in order to achieve a high recording density, the saturated magnetization amount (saturated magnetic flux density) (σs) of these ferromagnetic alloy powders is preferably 110 A·m$^2$/kg or more, and further preferably 120 A·m$^2$/kg or more and less than 170 A·m$^2$/kg or less. The coercive force (Hc) is preferably in a range of 1,500 to 2,500 oersted (Oe) (119 to 199 kA/m) (more preferably 1,700 to 2,200 oersted (135 to 175 kA/m), particularly preferably 1,800 to 2,100 oersted (143 to 167 kA/m)). Moreover, the average longer axis length of the particle measured by a transmission type electron microscope is 0.15 μm or less, preferably 0.01 to 0.12 μm, and the acicular ratio (the arithmetic average value of the longer axis length/shorter axis length) is 3 to 12, preferably 4 to 10. In order to further improve the characteristics, non-metals such as a B, a C, an Al, an Si, a P, or salts or oxides thereof may be added to the composition. In general, an oxide layer is formed on the particle surface of the above-mentioned metal powders for the chemical stabilization.

The plate-like hexagonal ferrite is a flat plate-like ferromagnetic substance having the axis of easy magnetization in the direction perpendicular to the flat plate surface. Specifically, a barium ferrite (the magneto plumbite type or the magneto plumbite type partially containing a spinel phase), a strontium ferrite (the magneto plumbite type or the magneto plumbite type partially containing a spinel phase), a lead ferrite, a calcium ferrite, a cobalt substituted substance thereof, or the like, can be presented. Among these examples, a cobalt substituted substance of a barium ferrite, and a cobalt substituted substance of a strontium ferrite are particularly preferable. In order to control the magnetic resistance, those having elements such as a Co—Ti, a Co—Ti—Zr, a Co—Ti—Zn, an Ni—Ti—Zn, an Ir—Zen, or the like, added as needed may be used as the plate-like hexagonal ferrite used in the invention.

In the plate-like hexagonal ferrite powder, the plate diameter denotes the width of the plate of the hexagonal plate-like particle. It can be measured by an electron microscope. In the plate-like hexagonal ferrite powder use in the invention, the particle size (average plate diameter) is preferably in a range of 0.001 to 0.05 $\mu$m, the tabular ratio (the arithmetic average value of the plate diameter/plate thickness) is in a range of 2 to 10, and the specific surface area thereof is in a range of 20 to 80 $m^2$/g. For the same reason as that of the ferromagnetic metal powder, in the case the particle size of the plate-like hexagonal ferrite powder is either too large or too small, high density recording can hardly be executed. Moreover, in order to achieve a high recording density, the saturated magnetization amount ($\sigma$s) of these plate-like hexagonal ferrite powders is preferably 50 A·$m^2$/kg or more (further preferably 53 A·$m^2$/kg or more). Furthermore, the coercive force (Hc) is preferably in a range of 1,500 to 2,500 oersted (Oe) (119 to 199 kA/m) (more preferably 1,700 to 2,200 oersted (135 to 175 kA/m), particularly preferably 1,800 to 2,100 oersted (143 to 167 kA/m)).

The water content of the ferromagnetic powder is preferably 0.01 to 2% by weight. Moreover, it is preferable to optimize the water content according to the kind of the binder (resin). It is preferable to optimize the pH of the ferromagnetic powder according to the combination with the binder to be used. The pH is, in general, in a range of 4 to 12, preferably in a range of 5 to 10. As the ferromagnetic powder, those having the surface thereof covered as needed at least partially with an Al, an Si, a P, a Y, an oxide thereof, or the like, are preferable. The amount thereof at the time of applying the surface treatment is, in general, 0.1 to 10% by weight with respect to the ferromagnetic powder. Since the ferromagnetic powder covered accordingly restrains the absorption of a lubricating agent, such as a fatty acid to 100 mg/$m^2$ or less, a desired effect can be achieved even with a small amount of the lubricating agent added to the magnetic layer. The ferromagnetic powder contains an inorganic ion of a soluble Na, Ca, Fe, Ni, Sr, or the like in some cases, but the content thereof is preferably as little as possible. In general, in the case it is 5,000 ppm or less, the characteristics are not influenced. The above-mentioned ferromagnetic powder and the production method therefore are disclosed in, for example, JP-A-7-22224.

The carbon black in the magnetic layer is added for various purposes such as reduction of the surface electric resistance ($R_s$) of the magnetic layer, reduction of the coefficient of dynamic friction ($\mu_K$ value) improvement of the running durability, obtainment of the flat and smooth surface property of the magnetic layer, or the like. The average particle size of the carbon black is preferably in a range of 5 to 350 nm (further preferably 10 to 300 nm). Moreover, the specific surface area thereof is preferably 5 to 500 $m^2$/g (further preferably 50 to 300 $m^2$/g). The DBP oil absorption amount is preferably in a range of 10 to 1,000 ml/100 g (further preferably 50 to 300 ml/100 g). Furthermore, it is preferable that the pH is 2 to 10, the water content is 0.1 to 10%, and the tap density is 0.1 to 1 g/cc.

As the carbon black, those obtained in various production methods can be used. Examples of the usable carbon black include a furnace black, a thermal black, an acetylene black, a channel black, and a lamp black. As specific merchandise examples of (a the carbon black, BLACK PEARLS 2000, 1300, 1000, 900, 800, 700, VULCAN XC-72 (so far produced by Cabot Corp.), #35, #50, #55, #60 and #80 (so far produced by Asahi Carbon Corp.), #3950B, #3750B, 03250B, #2400B, #2300B, #1000, #900, #40, #30, and #10B, (so far produced by Mitsubishi Chemical Corporation.), CONDUCTEX SC, RAVEN, 150, 50, 40, 15 (so far produced by Colombia Carbon Corp.) Ketchen Black EC, Ketchen Black ECDJ-500 and Ketchen Black ECDJ-600 (so far produced by Lion Aguzo Corp.) can be presented. An ordinary amount of the carbon black is in a range of 0.1 to 30 parts by weight (preferably 0.2 to 15 parts by weight) with respect to 100 parts by weight of the ferromagnetic powder.

As the polishing agent for the magnetic layer, for example, a molten alumina, an $\alpha$-alumina, a silicon carbide, a chromium oxide ($Cr_2O_3$), a corundum a manmade corundum, a diamond, a manmade diamond, a garnet, and an emery (main component: a corundum and a magnetite) can be presented. These polishing agents preferably have a 5 or more (preferably 6 or more, particularly preferably 8 $\mu$m or more) Moh'shardness, and a 0.05 to 1 $\mu$m (further preferably 0.2 to 0.8 $\mu$m) average particle size. The amount of the polishing agent is, in general, in a range of 3 to 25 parts by weight (preferably 3 to 20 parts by weight) with respect to 100 parts by weight of the ferromagnetic powder.

The lubricating agent of the magnetic layer is added for alleviating the friction between the magnetic layer surface and the magnetic head so as to smoothly maintain the sliding contact state by oozing out to the magnetic layer surface. As the lubricating agent, for example, a fatty acid and a fatty acid ester can be presented. As the fatty acid, for example, aliphatic carboxylic acids such as an acetic acid, a propionic acid, a 2-ethyl hexanoic acid, a lauric acid, a myristic acid, a palmitic acid, a stearic acid, a behenic acid, an arachic acid, an oleic acid, an elaidic acid, a linolic acid, a linolenic acid, and a palmitoleic acid, and mixtures thereof can be presented.

Moreover, as the fatty acid ester, for example, various esterified compounds such as a butyl stearate, a sec-butyl stearate, anisopropyl stearate, abutyl oleate, anamyl stearate, a 3-methyl butyl stearate, a 2-ethyl hexyl stearate, a 2-hexyl decyl stearate, a butyl palmitate, a 2-ethyl hexyl myristate, a mixture of a butyl stearate and a butyl palmitate, an oleil oleate, a butoxy ethyl stearate, a 2-butoxy-1-propyl stearate, a dipropylene glycol monobutyl ether acylated by a stearic acid, a diethylene glycol dipalmitate, a diol obtained by acylating a hexamethylene diol by a myristic acid, and an oleate of a glycerol, can be presented. The above-mentioned fatty acids, and the fatty acid esters can be used alone or as a combination of two or more compounds. The content of the lubricating agent is, in general, in a range of 0.2 to 20 parts by weight (preferably 0.5 to 10 parts by weight) with respect to 100 parts by weight of the ferromagnetic powder.

As the binder for the magnetic layer, for example, a thermoplastic resin, a thermosetting resin, a reactive type resin, and a mixture thereof can be presented. Examples of the thermoplastic resins include a vinyl chloride, a vinyl acetate, a vinyl alcohol, a maleic acid, an acrylic acid, an acrylate, a vinylidene chloride, an acrylonitrile, a methacrylic acid, a methacrylate, a styrene, a butadiene, an ethylene, a vinyl butylal, a vinyl acetal, and a polymer or a copolymer including a vinyl ether as a constituent unit. As the copolymer, for example, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a vinylidene chloride-acrylonitrile copolymer, a butadiene-acrylonitrile copolymer, a styrene-butadiene copolymer, and a chlorovinyl ether-acrylate copolymer can be presented.

In addition to the above-mentioned, a polyamide resin, a cellulose based resin (a cellulose acetate butylate, a cellulose diacetate, a cellulose propionate, a nitrocellulose, or the like), a polyvinyl fluoride, a polyester resin, a polyurethane resin, various rubber based resins, or the like, can be used as well.

Moreover, as the thermosetting resin or the reactive type resin, for example, a phenolresin, an epoxyresin, a polyurethane hardening type resin, a urea resin, a melamine resin, an alkyd resin, an acrylic based reactive resin, a formaldehyde resin, a silicone resin, an epoxy-polyamide resin, a mixture of a polyester resin and a polyisocyanate prepolymer, a mixture of a polyester polyol and a polyisocyanate, and a mixture of a polyurethane and a polyisocyante can be presented.

As the above-mentioned polyisocyante, for example, isocyanates such as a tolylene diisocyanate, a 4,4'-diphenyl methane diisocyanate, a hexamethylene diisocyanate, a xylylene diisocyanate, a naphthylene-1,5-diisocyanate, an o-toluidine diisocyante, an isophorone diisocyanate, and a tolyphenyl methane triisocyanate, a product of these isocyanates and a polyalcohol, and a polyisocyante produced by condensation of the isocyanates can be presented.

As the above-mentioned polyurethane resin, those known with a structure of a polyester polyurethane, a polyether polyurethane, a polyether polyester polyurethane, a polycarbonate polyurethane, a polyester polycarbonate polyurethane, a polycaprolactone polyurethane, or the like can be used.

In the present invention, it is preferable that the binder of the magnetic layer is a combination of a polyurethane resin and at least one resin selected from the group consisting of a vinyl chloride resin, avinyl chloride-vinyl acetate copolymer, a vinyl chloride-vinyl acetate-vinyl alcohol copolymer, a vinyl a chloride-vinyl acetate-maleic anhydride copolymer, and a nitrocellulose, or a combination produced by further adding thereto a polyisocyante as a hardening agent.

In order to ensure a superior dispersing property and the durability of the layer to be obtained, it is preferable to use the binder after introducing at least one polar group selected from the group consisting of —COOM, —SO$_3$M, —OSO$_3$M, —P=O(OM)$_2$, —O—P=(OM)$_2$ (wherein M denotes a hydrogen atom or an alkaline metal), —OH, —NR$_2$, —N$^+$R$_3$ (wherein R denotes a hydrocarbon group), an epoxy group, —SH, and —CN by copolymerization or addition reaction as needed. It is preferable that the polar group is introduced in the binder by a $10^{-1}$ to $10^{-8}$ mole/g (further preferably $10^{-2}$ to $10^{-6}$ mole/g) amount.

The binder in the magnetic layer is used, in general, in a range of 5 to 50 parts by weight (preferably 10 to 30 parts by weight) with respect to 100 parts by weight of the ferromagnetic powder. In the case a vinyl chloride based resin, a polyurethane resin, and a polyisocyante are used in a combination as the binder in the magnetic layer, it is preferable that 5 to 70% by weight of the vinyl chloride resin, 2 to 50% by weight of the polyurethane resin, and 2 to 50% by weight of the polyisocyanate are contained in the binder in these ranges.

To the coating liquid for forming the magnetic layer, a dispersing agent can be added in order to preferably disperse powders such as the ferromagnetic powder, and the carbon black in the binder. Moreover, as needed, a plasticizer, a conductive particle other than the carbon black (antistatic agent), an anti-mildew agent, or the like can be added. As the dispersing agent, for example, fatty acids having 12 to 18 carbon atoms (RCOOH, wherein R is an alkyl group or a alkenyl group having 11 to 17 carbon atoms) such as a caprylic acid, a capric acid, a lauric acid, a myristic acid, a palmitic acid, a stearic acid, a behenic acid, an oleic acid, an elaidic acid, a linolic acid, a linolenic acid, and a stearolic acid, a metal soap made of an alkaline metal or an alkaline earth metal of the above-mentioned fatty acids, a compound containing a fluorine of the above-mentioned fatty acid esters, an amide of the above-mentioned fatty acids, a polyalkylene oxide alkyl phosphate, a lecithin, a trialkyl polyolefinoxy quaternary ammonium salt (wherein the alkyl has 1 to 5 carbon atoms, and the olefin is an ethylene, a propylene, or the like), a sulfate, a copper phthalocyanine, or the like can be used. These can be used either alone or in a combination. The dispersing agent is added in a range of 0.5 to 20 parts by weight with respect to 100 parts by weight of the binder.

The non-magnetic layer will be described in detail. The non-magnetic layer is a substantially non-magnetic layer containing a non-magnetic powder and a binder. The non-magnetic layer should be substantially non-magnetic so as not to influence the electromagnetic conversion characteristics of the magnetic layer disposed above, but as long as an adverse effect is not given to the electromagnetic conversion characteristics of the magnetic layer, inclusion of the magnetic powder is not problematic. Moreover, in general, a lubricating agent is included in the non-magnetic layer in addition to these components.

As the non-magnetic powder used for the non-magnetic layer, for example, a non-magnetic inorganic powder, and a carbon black can be presented. As the non-magnetic inorganic powder, those relatively hard are preferable, and those having a 5 or more (further preferably 6 or more) Moh's hardness are preferable. As examples of the non-magnetic inorganic powder, an α-alumina, a β-alumina, a γ-alumina, a silicon carbide, a chromium oxide, a cerium oxide, an α-iron oxide, a corundum, a silicon nitride, a titanium carbide, a titanium dioxide, a silicon dioxide, a boron nitride, a zinc oxide, a calcium carbonate, a calcium sulfate, and a barium sulfate can be presented. These can be used alone or in a combination. Among these examples, a titanium dioxide, an α-alumina, an α-iron oxide and a chromium oxide are preferable. It is preferable that the average particle size of the non-magnetic inorganic powder is in a range of 0.01 to 1.0 µm (preferably 0.01 to 0.5 µm, particularly preferably 0.02 to 0.1 µm).

The carbon black in the non-magnetic layer is added for preventing charging by providing the conductivity to the magnetic layer as well as for ensuring the flat and smooth surface property to the magnetic layer formed on the non-magnetic layer. As the carbon black used for the non-magnetic layer, the above-mentioned carbon blacks usable for the magnetic layer can be used. However, as to the carbon black used for the non-magnetic layer, the average particle size thereof is preferably 35 nm or less (further preferably 10 to 35 nm). The amount of the carbon black is, in general, 3 to 20 parts by weight, preferably 4 to 18 parts by weight, and further preferably 5 to 15 parts by weight with respect to 100 parts by weight of the total non-magnetic inorganic powder.

As the lubricating agent for the non-magnetic layer, the fatty acids or the fatty acid esters in the above-mentioned description for the magnetic layer of the magnetic tape can be used. The amount of the lubricating agent is, in general, in a range of 0.2 to 20 parts by weight with respect to 100 parts by weight of the total non-magnetic powder of the non-magnetic layer.

As the binder for the non-magnetic layer, the binders in the above-mentioned description for the magnetic layer can be used. The amount of the binder is, in general, in a range of 5 to 50 parts by weight (preferably 10 to 30 parts by weight) with respect to 100 parts by weight of the non-magnetic powder of the non-magnetic layer. In the case a vinyl chloride based resin, a polyurethane resin, and a polyisocyanate are used in a combination as the binder in the non-magnetic layer, it is preferable that 5 to 70% by weight of the vinyl chloride resin, 2 to 50% by weight of the polyurethane resin, and 2 to 50% by weight of the polyisocyanate are contained in the binder in these ranges. The above-mentioned dispersing agents and the other additives usable for the magnetic layer can be used also for the non-magnetic layer.

Next, the back coating layer will be described in detail. The back coating layer contains mainly a carbon black. In the back coating layer, it is preferable to use two kinds of carbon blacks with different average particle sizes. In this case, it is preferable to use a fine particle carbon black with a 10 to 30 nm average particle size and a coarse particle carbon black with a 150 to 300 nm average particle size. In general, by adding the above-mentioned fine particle carbon black, the surface electric resistance of the back coating layer can be set at a low level. Moreover, the fine particle carbon black, in general, has the excellent holding power for the liquid lubricating agent so as to contribute to reduction of the friction coefficient in the case a lubricating agent is used. In contrast, the coarse particle carbon black with a 150 to 300 nm particle size has a function as a solid lubricating agent as well as forms fine projections on the surface of the back layer for reducing the contact surface area so as to contribute to reduction of the friction coefficient.

In the back coating layer, in the case two kinds of carbon blacks with different average particle sizes are used, the content ratio (weight ratio) of the fine particle carbon black of a 10 to 30 nm size and the coarse particle carbon black of a 150 to 300 nm size is preferably in a range of the former: the latter=2:98 to 20:80, and further preferably in a range of 4:96 to 15:85. Moreover, the content of the carbon black (in the case two kinds are used, the total amount thereof) in the back coating layer is preferably in a range of 500 to 1,500 parts by weight, further preferably 800 to 1,200 parts by weight with respect to 100 parts by weight of the binder. As the binder used in the back coating layer, those described for the magnetic layer can be used. It is preferable to use a nitro cellulose resin and a polyester polyurethane resin in a combination.

In order to provide the repeated running durability to the tape and reinforce the back coating layer, an inorganic powder of a 5 to 9 Moh's hardness may be added. In the case the inorganic powder is used together with the carbon black, a strong back coating layer with little deterioration with respect to the repeated slide can be provided. Moreover, in the case an inorganic powder of a 5 to 9 Moh's hardness is used, an appropriate polishing force is generated so that adhesion of shavings, or the like to a tape guide ball, or the like, can be reduced. It is preferable that the average particle size of the inorganic powder of a 5 to 9 Moh's hardness is in a range of 0.01 to 1 $\mu$m (further preferably 0.05 to 0.5 $\mu$m, particularly preferably 0.08 to 0.3 $\mu$m).

As the inorganic powder of a 5 to 9 Moh's hardness, for example, an $\alpha$-iron oxide, an $\alpha$-alumina, and a chromium oxide ($Cr_2O_3$) can be presented. These powders can be used alone or in a combination. Among these examples, the $\alpha$-iron oxide and the $\alpha$-alumina are preferable. The content of the inorganic powder of a 5 to 9 Moh's hardness is 0.01 to 5 parts by weight, preferably 0.05 to 2 parts by weight with respect to 100 parts by weight of the carbon black.

To the back coating layer, the dispersing agents described for the magnetic layer can be added. As the dispersing agent, it is preferable to use a copper oleate, a copper phthalocyanine, and a barium sulfate in a combination. The dispersing agent is added, in general, in a range of 0.5 to 20 parts by weight with respect to 100 parts by weight of the binder.

Next, the production method for a magnetic tape of the invention will be explained briefly. A magnetic tape according to the invention can be produced by forming a non-magnetic layer and a magnetic layer on one surface of a support, and a back coating layer on the other surface in an ordinary method.

It is preferable that the magnetic layer is formed on the non-magnetic layer while it is still in a wet state. That is, it is preferable that the magnetic layer is formed by a method of coating a coating liquid for a magnetic layer on a coating layer (non-magnetic layer) formed by coating a coating liquid for a non-magnetic layer still in a wet state, that is, the so-called wet on wet method.

As the above-mentioned coating method by the wet on wet method, for example, the following can be presented.

(1) A method of forming a magnetic layer by forming a non-magnetic layer on a support with a device for gravure coating, roll coating, blade coating, or extrusion coating, and then forming a magnetic layer on the non-magnetic layer still in a wet state with a support pressuring type extrusion coating device (see JP-A-60-238179, JP-B-1-46186, JP-A-2-265672).

(2) a method of forming a magnetic layer and a non-magnetic layer on a support substantially simultaneously with a coating device having a single coating head comprising two slits for a coating liquid (see JP-A-63-88080, JP-A-2-17921, JP-A-2-265672).

(3) A method of forming a magnetic layer and a non-magnetic layer on a support substantially simultaneously with an extrusion coating device with a back up roller (see JP-A-2-174965). In the invention, it is preferable to form the non-magnetic layer and the magnetic layer using the simultaneous superimposing layer coating method.

It is preferable that the surface roughness (Ra) of the magnetic layer formed as mentioned above is preferably 0.1 to 4 nm (further preferably 0.3 to 2.5 nm, particularly preferably 0.3 to 2.2 nm) by measurement by the light interference method (TOPO3D produced by WYKO Co.).

Moreover, the surface property of the back coating layer tends to be transferred onto the surface of the magnetic layer in the case the tape is in the wound state. Therefore, it is preferable that the back coating layer also has a relatively high flat and smooth property. It is preferable that the surface roughness Ra (center line average roughness at a 0.08 mm cut off) of the back coating layer of a magnetic tape of the invention is adjusted in a range of 0.0030 to 0.060 $\mu$m. The surface roughness can be adjusted in general, by the material of the calendar roll to be used, the surface property thereof, and the pressure, or the like in a surface treatment step with a calendar after forming a coating film.

It is preferable that the non-magnetic layer of the magnetic tape of the invention is formed by a thickness in a range of 0.2 to 3.0 μm (further preferably 1.0 to 2.5 p). It is preferable that the magnetic layer is formed by a thickness in a range of 0.01 to 1.0 μm (further preferably 0.05 to 0.8 μm, particularly preferably 0.08 to 0.5 μm, most preferably 0.1 to 0.3 μm). It is preferable form the back coating layer by a thickness in a range of 0.2 to 0.8 μm. Moreover, the thickness of the entire magnetic tape of the invention is preferably in a range of 5to 10 μm (further preferably 7 to 9.5 μm, particularly preferably 7.5 to 9.5 μm). Although it depends on the magnetic recording and reproduction system to be used, the width of the magnetic tape of the invention is preferably in a range of 5 to 13 mm (further preferably 7 to 13 mm, particularly preferably 10 to 13 mm) so as to be used advantageously for recording computer data.

Since the magnetic tape of the invention is formed in a configuration wherein the size change of the tape particularly in the width direction can hardly be influenced by the temperature and humidity, it can be used advantageously for a magnetic recording system using a reproduction MR head in a linear recording method. In particular, the magnetic tape of the invention is effective in the case of using a system wherein the head position is controlled by a servo signal, and thus it is preferable that a servo signal is recorded along the longitudinal direction of the magnetic tape. Thereby, the tracking accuracy can further be improved.

The reproduction head is not particularly limited, and those conventionally used can be utilized. In particular, it is preferable to use an MR head with a shield type or vertical type MR element (such as one comprising an Fe/Ni (permalloy) alloy thin film) slidable with the magnetic tape.

EXAMPLES

Hereinafter, the invention will be described further specifically with reference to examples and comparative examples. In the description below, the "part" denotes the "part by weight" unless otherwise specified.

(I)
[Preparation of a coating liquid for forming a non-magnetic layer and a coating liquid for forming a magnetic layer]

(Component for forming a non-magnetic layer)
Non-magnetic powder

| | |
|---|---|
| Titanium dioxide $TiO_2$ (rutile type) [$TiO_2$ content: 90% or more average primary particle size: 0.035 μm specific surface area by the BZ-T method: 40 m$^2$/g pH: 7.0 DBP oil absorption amount: 27 to 38 g/100 g Moh's hardness: 6.0 Surface covering compound ($Al_2O_3$): 1.5% by weight] | 90 parts |
| Carbon black (produced by Mitsubishi Carbon Corp.) [average primary particle size: 16 nm DBP oil absorption amount: 80 ml/100 g pH: 8.0 specific surface area by the BET method: 250 m$^2$/g volatile component: 1.5%] | 10 parts |
| Polar group (-SO$_3$K group, epoxy group) containing vinyl chloride resin [(MR-110, produced by Nihon Zeon Corp.)] | 12 parts |

-continued (I)
[Preparation of a coating liquid for forming a non-magnetic layer and a coating liquid for forming a magnetic layer]

| | |
|---|---|
| Polar group (-SO$_3$Na group) containing polyester polyurethane resin [neopentyl glycol/caprolactone polyol/diphenyl methane-4,4'-diisocyanate (MDI) = 0.9/2.6/1 (weight ratio) containing —SO$_3$Na group 1 × 10$^{-4}$ mole/g] | 5 parts |
| Polyisocyanate [(Coronate L, produced by Nihon Polyurethane Kogyo Corp.)] | 3 parts |
| butyl stearate | 1 parts |
| stearic acid | 2 parts |
| methyl ethyl ketone | 150 parts |
| cyclohexanone | 50 parts |

(Component for forming a magnetic layer)

| | |
|---|---|
| Ferromagnetic metal powder [composition/Fe:Co = 90:10 (atomic ratio) coercive force (Hc): 1,850 oersted (Oe) (147 kA/m) specific surface area by the BET method: 58 m$^2$/g crystal size: 17.5 nm saturated magnetization amount (σs): 130 emu/g particle size (average longer axis size): 0.09 μm acicular ratio: 7.0 pH: 8.6 water-soluble Na: 70 ppm water-soluble Ca: 10 ppm water-soluble Fe: 10 ppm] | 100 parts |
| Polar group (-SO$_3$K group containing vinyl chloride based copolymer [-SO$_3$K group content: 5 × 10$^{-6}$ mole/g, polymerization degree 350 epoxy group content: 3.5% by weight based on the monomer unit (MR-110, produced by Nihon Zeon Corp.)] | 12 parts |
| Polar group (-SO$_3$Na group) containing polyester polyurethane resin [neopentyl glycol/caprolactone polyol/diphenyl methane-4,4'-diisocyanage (MDI) = 0.9/2.6/1 (weight ratio) -SO$_3$Na group content: 1 × 10$^{-4}$ mole/g] | 3 parts |
| Polyisocyanate [(Coronate L, produced by Nihon Polyurethane Kogyo Corp.)] | 3 parts |
| α-alumina [(particle size: 0.2 μm)] | 5 parts |
| carbon black [(particie size: 0.08 μm)] | 0.5 parts |
| butyl stearate | 1 parts |
| stearic acid | 2 parts |
| methyl ethyl ketone | 150 parts |
| cyclohexanone | 50 parts |

Each component for forming a non-magnetic layer or a magnetic layer was kneaded with a continuous kneader, and dispersed with a sand mill. By adding 3 parts of the polyisocyanate each to the obtained dispersion liquids for the non-magnetic layer and the magnetic layer, further adding each 40 parts of a butyl acetate thereto, and filtrating the same with a filter having a 1 μm average hole size, a coating liquid for forming a non-magnetic layer and a coating liquid for forming a magnetic layer were prepared, respectively.

[Preparation of a coating liquid for forming a back coating layer]

(component for forming a back coating layer)

| | |
|---|---|
| carbon black [average primary particle size: 17 nm DBP oil absorption amount: 75 ml/100 g pH: 8.0 specific surface area by the BET method: 220 m$^2$/g volatile component: 1.5% bulk density: 15 lbs/ft$^3$ (240 kg/m$^3$)] | 100 parts |

-continued

[Preparation of a coating liquid for forming a back coating layer]

| | |
|---|---|
| Nitro cellulose resin | 100 parts |
| Polyester polyurethane resin | 30 parts |
| [(Nipporan, produced by Nihon Polyurethane Kogyo Corp.)] | |
| dispersing agent: oleate copper | 10 parts |
| copper phthalocyanine | 10 parts |
| barium sulfate (sedimentation type) | 5 parts |
| methyl ethyl ketone | 500 parts |
| toluene | 500 parts |
| The above-mentioned components were preliminarily kneaded, and kneaded with a roll mill. With the below-mentioned components added with respect to 100 parts by weight of the obtained dispersion product, a dispersing operation was executed with a sand grinder. | |
| Carbon black | 100 parts |
| [average primary particle size: 200 nm DBP oil absorption amount: 36 ml/100 g pH: 8.5 specific surface area by the BET method: 200 m²/g] | |
| α-alumina [(particle size: 0.2 μm)] | 0.1 part |

After filtrating the obtained dispersion product, 120 parts of a methyl ethyl ketone and 5 parts of a polyisocyanate were added to with respect to 100 parts by weight of the dispersion product so as to prepare a coating liquid for forming a back layer.

Support

A support having the characteristics as shown in the table 1 was prepared. Here, the number of projections of a 273 nm or more height existing on the magnetic layer coating surface side was measured as follows.

A 2 cm×2 cm size sample was observed with a differential interference microscope (100 times or less) for marking projections. The height and the width of the marked projections were measured with a type HD-2000 produced by WYKO Corp.

The measurement conditions were as follows; objective lens: ×50, intermediate lens: ×0.5.

TABLE 1

| | support | thickness μm | A/B surface Ra nm | Young's modulus MD/TD MPa | Number of projections Pieces/100 cm² |
|---|---|---|---|---|---|
| Example 1 | PEN | 6 | 1.0/4.0 | 7840/6370 | 5 |
| Example 2 | " | " | " | " | 9 |
| Example 3 | " | " | " | " | 8 |
| Example 4 | " | " | " | " | 0 |
| Example 5 | " | " | 0.5/4.0 | " | 0 |
| Comp. Ex. 1 | " | " | 1.0/4.0 | 8820/5390 | 5 |
| Comp. Ex. 2 | " | " | " | 6860/7448 | 5 |
| Comp. Ex. 3 | PET | " | " | 7448/3920 | 5 |
| Comp. Ex. 4 | PEN | " | " | 7840/6370 | 14 |
| Comp. Ex. 5 | " | " | 6.0/6.0 | " | 50 |
| Comp. Ex. 6 | " | " | 2.0/4.0 | " | 12 |
| Comp. Ex. 7 | " | " | 1.0/2.0 | " | 8 |

PEN: polyethylene naphthalate
PET: polyethylene terephthalate

Production of a Magnetic Tape for Recording Computer Data

The obtained coating liquid for forming a non-magnetic layer and coating liquid for forming a magnetic layer were applied on a support by simultaneous superimposing coating such that the thickness of the non-magnetic layer after drying can be 2.1 μm, and the thickness of the magnetic layer after drying can be 0.20 μm. While both layers were still in a wet state, an orientation process was executed with a cobalt magnet having a 0.3 T magnetic flux density and a solenoid having a 0.15 T magnetic flux density. According to a drying operation, a non-magnetic layer and a magnetic layer were produced.

Then, by coating the coating liquid for forming a back coating layer on the other side of the support (on the side opposite to the magnetic layer) so as to have a 0.5 μm thickness after drying, followed by a drying operation so as to provide a back coating layer, a magnetic recording laminated product roll with the non-magnetic layer and the magnetic layer provided on one surface of the support, and the back coating layer provided on the other surface, was obtained.

A calendar process was executed by passing the obtained magnetic recording laminated product roll through a 7-stage calendar processing machine comprising only metal rolls (90° C. temperature, 300 kg/cm linear pressure (294 kN/m)). The magnetic recording laminated product roll after the calendar process was slit in a ½ inch width so as to obtain a magnetic tape for recording computer data according to the invention (hereinafter referred to simply as a magnetic tape). 580 m of the obtained magnetic tape was stored in a 3480 type ½ inch cartridge.

Assembly of a Magnetic Recording and Reproduction System (1) thin film magnetic head recording head structure: an inductive head with a two turn thin film coil clamped by a Co based amorphous magnetic thin film yoke. track width: 24 μm, gap length: 1.4 μm reproduction head structure: double shielded shunt bias MR (magnetoresistive type) head. The MR element is an Fe/Ni (permalloy) alloy thin film. track width: 10 μm, shield interval: 1.4 μm (2) An assembled recording and reproduction head for a magnetic recording and reproduction system was mounted on an F613A drive produced by Fujitsu Corp. (3480 type, ½ inch cartridge magnetic tape recording and reproduction device) so as to provide a magnetic recording and reproduction system with a 100 inch/second tape speed.

Evaluation as a Magnetic Tape (1) The temperature expansion coefficient and the humidity expansion coefficient, the offset yield strength and the rupture strength of the magnetic tapes obtained in the examples 1 to 5 and the comparative examples 1 to 7 were measured by the following methods.

Measurement of the temperature expansion coefficient and the humidity expansion coefficient: A sample was prepared by cutting the magnetic tape by 30 mm in the width direction thereof and 5 mm width in the longitudinal direction. The sample was set on a chucking part of a TMA device so as to be aged for 24 hours in a desicater. The sample after ageing was set in the TMA device for measuring the size change at a 20 to 30° C. temperature, and the temperature expansion coefficient was calculated by the below-mentioned formula.

Temperature expansion coefficient=(size change/sample length)/ temperature change In the same manner, the size change at a 30% RH to 80% RH humidity was measured, and the humidity expansion coefficient was calculated by the below-mentioned formula.

Humidity expansion coefficient=(size change/sample length)/humidity change

Measurement of the offset yield strength and the rupture strength: The dynamical strength of a magnetic tape cut by a 200 mm length was measured with a Tensitoron by a 100 mm/minute drawing rate.

(2) The magnetic performance was evaluated according to the below-mentioned methods (A) to (C).

(A) With the magnetic tapes of the examples and the comparative examples mounted on the above-mentioned magnetic recording and reproduction system, the reproduction output was measured in the below-mentioned conditions, and the magnetic tape characteristics were evaluated with respect to the environmental change.

(A-1) In the case of not having the servo control, data were recorded in a 5° C., 10% RH condition by a 20 μm track width and a 128 track number by a 0.55 μm recording wavelength, and reproduced by a reproduction head having a 10 μm width. The output in the above-mentioned environmental condition at the time of reproduction was compared with that in the case of a 55° C., 70% RH condition and evaluated.

(A-2) In the case of having the servo control, data were recorded in a 5° C., 10% RH condition by a 20 μm track width and a 128 track number by a 0.4 μm recording wavelength, and reproduced by a reproduction head having a 10 μm width while executing the track control by the servo with three servo bands. The output in the above-mentioned environmental condition at the time of reproduction was compared with that in the case of a 55° C., 70% RH condition and evaluated.

Output ratio (%)=(the output at 55° C., 70% RH)/(the output at 5° C., 10% RH)×100

(B) With the magnetic tapes (without track control by a servo signal) of the examples and the comparative examples mounted on the above-mentioned magnetic recording and reproduction system, repeated running was executed by 5,000 passes for the tape entire length. The reproduction output was measured for the entire length of the magnetic tape for evaluating the output decline of the magnetic tape.

(C) With the magnetic tapes (with track control by a servo signal) of the examples and the comparative examples mounted on the above-mentioned magnetic recording and reproduction system, repeated running was executed (completion: 50,000 times). The number of passes at the time of generating an error was measured for evaluating the running characteristics of the magnetic tape.

(D) With a servo control executed under a 21° C., 50% RH condition, one track (track width: 20 μm) was reproduced by a 90 m length tape. The 35% or more output deterioration with a signal lack of 4 bit or more length was judged to be an error, and the number of generation thereof was measured.

In either case of the above-mentioned (B) to (D), the tension of the magnetic tape at the time of running in the system (in the drive) was set to be 1.0 N. However, the tension on the tape at the time the magnetic tape reaches at the BOT part or the EOT part is excluded. Results of the evaluations are shown in the tables 2 and 3.

TABLE 2

|  | temperature expansion coefficient | humidity expansion coefficient | offset yield strength | rupture strength | output | output ratio % serve control | |
| --- | --- | --- | --- | --- | --- | --- | --- |
|  | %/° C. | %/% RH | N | N | dB | yes | no |
| Example 1 | 0.0006 | 0.0012 | 11.0 | 31.0 | 0 | 94 | 99 |
| Example 2 | 0.0006 | 0.0012 | 11.0 | 31.0 | 0.1 | 94 | 99 |
| Example 3 | 0.0006 | 0.0012 | 11.0 | 31.0 | 0 | 94 | 99 |
| Example 4 | 0.0006 | 0.0012 | 11.0 | 31.0 | 0 | 94 | 99 |
| Example 5 | 0.0006 | 0.0012 | 11.0 | 31.0 | 1.0 | 94 | 99 |
| Comp. Ex. 1 | 0.00175 | 0.0016 | 11.7 | 35.0 | −0.2 | 74 | 82 |
| Comp. Ex. 2 | 0.0003 | 0.0010 | 8.7 | 27.0 | 0.1 | 99 | 100 |
| Comp. Ex. 3 | 0.0020 | 0.0015 | 7.7 | 33.0 | −0.3 | 72 | 80 |
| Comp. Ex. 4 | 0.0006 | 0.0012 | 11.0 | 31.0 | 0 | 94 | 99 |
| Comp. Ex. 5 | 0.0006 | 0.0012 | 11.0 | 31.0 | −4 | 94 | 99 |
| Comp. Ex. 6 | 0.0006 | 0.0012 | 11.0 | 31.0 | −2 | 94 | 99 |
| Comp. Ex. 7 | 0.0006 | 0.0012 | 11.0 | 31.0 | 0.2 | 94 | 99 |

TABLE 3

|  | output decline | running property | number of errors pieces |
| --- | --- | --- | --- |
| Example 1 | None | Completion | 60 |
| Example 2 | None | Completion | 130 |
| Example 3 | None | Completion | 110 |
| Example 4 | None | Completion | 30 |
| Example 5 | None | Completion | 20 |
| Comparative example 1 | None | Completion | 60 |
| Comparative example 2 | 40% | 13,000 times | 65 |
| Comparative example 3 | 45% | 9,000 times | 60 |
| Comparative example 4 | None | Completion | 155 |
| Comparative example 5 | None | Completion | 300 |
| Comparative example 6 | None | Completion | 150 |
| Comparative example 7 | 55% | 6,000 times | 130 |

From the results shown in the tables 2 and 3, it was learned that the magnetic tapes (examples 1 to 5) having the temperature and humidity expansion coefficients in the magnetic tape width direction, and the offset yield strength and the rupture strength in the tape longitudinal direction in the range defined in the invention have little output fluctuation (90% or more was achieved) regardless of whether or not the tracking control by a servo signal is executed. Moreover, the output decline was hardly found even in the case of running for the 5,000 passes in the system, and the test was completed with little error generation. Therefore, it was observed that the size change in the width direction of the tapes is little with respect to the temperature and humidity change so that good tracking characteristics can be provided as well as high running characteristics can also be provided. Therefore, it was learned that the magnetic tape according to the invention is suitable for a magnetic recording and reproduction system with an MR head assembled.

In the case the temperature and humidity expansion coefficients in the width direction of the tape are outside the range defined by the invention, the size change in the width direction of the tape is large so that the output ratio is fluctuated due to the influence by the temperature and humidity change (comparative examples 1, 3). In the case the offset yield strength and the rupture strength in the longitudinal direction of the tape are outside the range defined by the invention, a physically irreversible change is generated due to the tension on the tape at the BOT part and the EOT part at the time of stopping the tape running operation so that the output decline is generated after the repeated running operation, and thus the running characteristics are particularly deteriorated (comparative examples 2, 3).

In the case the number of projections of a 273 nm or more height existing on the magnetic layer coating surface side of the support is outside the range defined by the invention, the number of errors is increased (comparative examples 4 to 6). Moreover, in the case the central surface average roughness of the support on the magnetic layer coating surface side is outside the range defined by the invention, the output decline is generated (comparative examples 5, 6). In the case the central surface average roughness of the support on the back coating layer side is outside the range defined by the invention, the running characteristics are particularly deteriorated (comparative example 7).

(II) In the same manner as in the item (I) except that the support was replaced by one having the characteristics shown in the table 4, magnetic tapes were produced, and each tape was evaluated as in the item (I). Results of the evaluation are shown in the tables 5 and 6.

TABLE 4

| | support | thickness µm | A/B surface Ra nm | Young's modulus MD/TD MPa | Number of projections Pieces/ 100 cm² |
|---|---|---|---|---|---|
| Example 6 | PEN | 6 | 1.0/4.0 | 9800/7252 | 5 |
| Example 7 | " | " | 0.5/4.0 | " | 0 |
| Comp. Ex. 8 | " | " | 1.0/4.0 | 10780/6170 | 5 |
| Comp. Ex. 9 | " | " | 1.0/4.0 | 8820/8330 | 5 |
| Comp. Ex. 10 | PET | " | 1.0/4.0 | 6370/2940 | 5 |

PEN: polyethylene naphthalate
PET: polyethylene terephthalate

TABLE 5

| | temperature expansion coefficient | humidity expansion coefficient | offset yield strength | rupture strength | output | output ratio % serve control | |
|---|---|---|---|---|---|---|---|
| | %/° C. | %/% RH | N | N | dB | yes | no |
| Example 6 | 0.0006 | 0.0012 | 12.0 | 37.0 | 0.3 | 96 | 99 |
| Example 7 | 0.0006 | 0.0012 | 12.0 | 37.0 | 1.2 | 96 | 99 |
| Comp. Ex. 8 | 0.00175 | 0.0016 | 11.7 | 35.0 | 0.2 | 74 | 82 |
| Comp. Ex. 9 | 0.0003 | 0.0010 | 8.7 | 27.0 | 0.2 | 99 | 100 |
| Comp. Ex. 10 | 0.0020 | 0.0015 | 6.2 | 25.0 | −0.4 | 72 | 78 |

TABLE 6

| | output decline | running property | number of errors pieces |
|---|---|---|---|
| Example 6 | None | Completion | 55 |
| Example 7 | None | Completion | 30 |
| Comparative example 8 | None | Completion | 60 |
| Comparative example 9 | 45% | 13,000 times | 60 |
| Comparative example 10 | 35% | 8,000 times | 60 |

As in the item (I), from the results shown in the tables 5 and 6, it was learned that the tapes of the invention have little size change in the width direction of the tape with respect to the temperature and humidity change, and thus they have high output and good tracking characteristics as well as high running characteristics. Therefore, it was confirmed that the magnetic tapes according to the invention are suitable for the magnetic recording and reproduction system with an MR head assembled.

A magnetic tape of the invention is prepared such that the size change can hardly be generated with little size change generation in the width direction with respect to the environmental change particularly in terms of temperature and humidity and with the dynamical strength in the longitudinal direction reinforce, and thus it can be used advantageously in a magnetic recording and reproduction system using an MR head. Therefore, even with a narrow track width in recording and reproduction, track displacement can hardly be generated, and thus recording and reproduction can be executed with a high reliability. It can be utilized particularly advantageously in a system having a function of executing the tracking control by a servo signal. Moreover, by controlling the surface roughness of the magnetic tape, error generation is restrained as well as friction at the time of running is reduced so as to improve the tape durability. By using the magnetic tape of the invention in the above-mentioned system, the data transfer speed can be improved, and furthermore, a high density recording is enabled. As a result, a high capacity recording can be achieved. It particular, it can be used advantageously for recording computer data.

This application is based on Japanese patent applications JP 2000-382314, filed Dec. 15, 2000, the entire content of which is hereby incorporated by reference, the same as if set forth at length.

What is claimed is:

1. A magnetic tape comprising:

a back coating layer containing a carbon black;

a support;

a non-magnetic layer containing a non-magnetic powder and a binder, which is substantially non-magnetic; and a magnetic layer containing a ferromagnetic powder and a binder, in this order, wherein the magnetic tape is a magnetic tape for recording a signal with a 10 to 100 Mbit/cm$^2$ surface recording density; the magnetic tape has a temperature expansion coefficient in a width direction thereof of a 0.0015%/° C. or less, a humidity expansion coefficient of 0.0015%/% RH or less, an offset yield strength in a longitudinal direction thereof of 10N or more, a rupture strength of 30 N or more; and the support has a center plane average roughness on a coating surface side of the magnetic layer of 1.0 nm or less, a center plane average roughness on a coating surface side of the back coating layer of 3.0 to 9.0 nm, and projections having a 273 nm or more height existing on the coating surface side of the magnetic layer of 10 pieces/100 cm$^2$ or less.

2. The magnetic tape according to claim 1, wherein the support comprises a polyethylene naphthalate.

3. The magnetic tape according to claim 1, wherein the support has a center plane average roughness on a coating surface side of the back coating layer of 5.0 nm or less.

4. The magnetic tape according to claim 1, wherein the support projections having a 273 nm or more height existing on the coating surface side of the magnetic layer of 5 pieces/100 cm$^2$ or less.

5. The magnetic tape according to claim 1, which has a width of 5 to 13 mm.

6. The magnetic tape according to claim 1, which has an entire thickness of 5 to 10 μm.

7. The magnetic tape according to claim 1, wherein the support has a Young's modulus in a lateral direction thereof of 600 kg/mm$^2$ (5,880 MPa).

8. The magnetic tape according to claim 1, wherein the support has a Young's modulus in a longitudinal direction thereof of 750 kg/mm$^2$ (7,350 MPa).

9. The magnetic tape according to claim 1, which has a Young's modulus in a lateral direction thereof of 650 kg/mm$^2$ (6,370 MPa).

10. The magnetic tape according to claim 1, which has a Young's modulus in a longitudinal direction thereof of 950 kg/mm$^2$ (9,310 MPa).

11. The magnetic tape according to claim 1, wherein the magnetic layer has a surface roughness Ra of 0.1 to 4 nm.

12. The magnetic tape according to claim 1, wherein the back coating layer has a surface roughness Ra of 0.0030 to 0.060 μm.

* * * * *

UNITED STATES PATENT AND TRADEMARK OFFICE
CERTIFICATE OF CORRECTION

PATENT NO.    : 6,767,610 B2
DATED         : July 27, 2004
INVENTOR(S)   : Masatoshi Takahashi, Minoru Sueki and Toshiyuki Kitahara It is certified that error appears in the above-identified patent and that said Letters Patent is hereby corrected as shown below:

Title page,
Item [73], Assignee, replace "Fuji Photo Film, Co., Inc." with:
-- Fuji Photo Film, Co., Ltd. --

Signed and Sealed this

Tenth Day of May, 2005

JON W. DUDAS
*Director of the United States Patent and Trademark Office*